(12) United States Patent
Agrell et al.

(10) Patent No.: US 8,676,055 B2
(45) Date of Patent: Mar. 18, 2014

(54) DATA TRANSMISSION SYSTEM AND METHOD

(75) Inventors: Erik Agrell, Partille (SE); Martin Sjodin, Gothenburg (SE)

(73) Assignee: Qamcom Technology AB, Göteborg (SE)

( * ) Notice: Subject to any disclaimer, the term of this patent is extended or adjusted under 35 U.S.C. 154(b) by 75 days.

(21) Appl. No.: 13/503,692

(22) PCT Filed: Oct. 29, 2010

(86) PCT No.: PCT/EP2010/066454
§ 371 (c)(1),
(2), (4) Date: Apr. 24, 2012

(87) PCT Pub. No.: WO2011/051437
PCT Pub. Date: May 5, 2011

(65) Prior Publication Data
US 2012/0207476 A1 Aug. 16, 2012

Related U.S. Application Data

(60) Provisional application No. 61/255,884, filed on Oct. 29, 2009.

(51) Int. Cl.
*H04J 14/06* (2006.01)
(52) U.S. Cl.
USPC .............. 398/65; 398/182; 398/184; 398/152
(58) Field of Classification Search
None
See application file for complete search history.

(56) References Cited

U.S. PATENT DOCUMENTS

| | | | | |
|---|---|---|---|---|
| 8,068,742 B2* | 11/2011 | Cole et al. | ...................... | 398/184 |
| 2005/0117915 A1 | 6/2005 | Miyazaki | | |
| 2006/0228118 A1 | 10/2006 | Schemmann et al. | | |
| 2008/0145052 A1* | 6/2008 | Hecker et al. | ................... | 398/65 |
| 2010/0196008 A1* | 8/2010 | Szafraniec et al. | ............. | 398/65 |

FOREIGN PATENT DOCUMENTS

DE 102005003679 8/2006

\* cited by examiner

*Primary Examiner* — Shi K Li
*Assistant Examiner* — Merlin Brito Peguero
(74) *Attorney, Agent, or Firm* — Babcock IP, PLLC

(57) ABSTRACT

A method of transmitting data using electromagnetic waves, comprising the steps of providing (101) a first electromagnetic signal ($S_1$) having a first wavelength ($\lambda_1$) and a second electromagnetic signal ($S_2$) having a second wavelength ($\lambda_2$) different from the first wavelength; dividing (102) each of the first ($S_1$) and second ($S_2$) electromagnetic signals into a first polarization component ($S_{1x}$; $S_{2x}$) having a first polarization direction and a second polarization component ($S_{1y}$; $S_{2y}$) having a second polarization direction orthogonal to the first polarization direction; modulating (103) the first polarization component ($S_{1x}$) of the first electromagnetic signal ($S_1$) to encode a first data stream ($DS_1$); modulating (104) the second polarization component ($S_{2y}$) of the second electromagnetic signal ($S_2$) to encode a second data stream ($DS_2$); and transmitting (105) a combined electromagnetic signal ($S_{comb}$) comprising the first and second polarization components of the first electromagnetic signal ($S_1$) and the first and second polarization components of the second electromagnetic signal ($S_2$).

9 Claims, 4 Drawing Sheets

DATA TRANSMISSION SYSTEM AND METHOD

TECHNICAL FIELD OF THE INVENTION

The present invention relates to a method of transmitting data using polarization divided electromagnetic waves, to a transmitter, a receiver and a data transmission system comprising such a transmitter and receiver.

TECHNICAL BACKGROUND

Due to the ever increasing amount of data being exchanged globally, there is a need for systems and methods enabling faster transmission of data, wirelessly as well as through various types of wires.

For example, the capacity of fiber-optical communication systems has so far increased exponentially, mainly due to hardware improvements—better fibers, lasers, detectors, amplifiers, etc, are being developed.

As a complement to improvements in hardware, system designers are also looking for other options for further improving the data transmission capacity, since, although further improvements in hardware is probably possible, the cost is expected to be rather high in relation to the resulting improvements in data transmission capacity. A similar development has to a large extent already taken place in wireless communications.

One such other option for further improving the data transmission capacity is to use advanced modulation formats. In so-called I/Q modulation, both the amplitude and phase of the electromagnetic wave are used, which increases the transmission capacity, but unfortunately also the receiver complexity. More specifically, the receiver needs to be supported by a synchronization module, which by ND conversion and signal processing recovers a phase reference from the data signal. I/Q modulation is included in many communication standards, but synchronization difficulties have so far prevented it from reaching the market for applications with very high data rates, such as fiber-optical communication systems.

Another method to increase the data transmission capacity of a data transmission system exploits the fact that electromagnetic waves can be decomposed into two independent polarizations. By sending data in both polarizations, and detecting them independently of each other, the capacity can be doubled. This technique is already in use in some wireless systems. It has also been demonstrated experimentally over optical fibers and seems to be ready for commercial deployment soon. This concept is illustrated in FIG. 2a, where x and y represent the two polarization planes. The figure also shows how data is transmitted with different wavelengths λ in order to utilize the full available electromagnetic spectrum.

Instead of sending data in both polarizations, one may transmit data in one polarization and a pilot tone (an unmodulated carrier, i.e., a pure sinusoid) in the other polarization, such as is, for example, described in U.S. Pat. No. 7,421,210. This method is sometimes referred to as "self homodyne". A similar known data transmission scheme, which also includes wavelength multiplexing is illustrated in FIG. 2b. The purpose is that the pilot tone can serve as a phase reference for the data signal if both have the same wavelength and are in phase, which makes it possible to use I/Q modulation without any synchronization in the receiver, which means that the configuration of the receiver becomes simpler and thus potentially less costly. Although the system in FIG. 2b contains half the number of data signals as compared to the system of FIG. 2a, more advanced modulation formats (higher data rates) in each data signal allows the system of FIG. 2b to reach the same total capacity as the system of FIG. 2a, or higher. It would, however, be desirable to achieve an even higher data transmission capacity without significantly increasing the complexity of the data transmission system.

SUMMARY OF THE INVENTION

In view of the above-mentioned and other drawbacks of the prior art, a general object of the present invention is to provide for a higher data transmission capacity without the need for a significantly more complex transmission system.

According to a first aspect of the present invention, these and other objects are achieved through a method of transmitting data using electromagnetic waves, comprising the steps of: providing a first electromagnetic signal having a first wavelength and a second electromagnetic signal having a second wavelength different from the first wavelength; dividing each of the first and second electromagnetic signals into a first polarization component having a first polarization direction and a second polarization component having a second polarization direction orthogonal to the first polarization direction; modulating the first polarization component of the first electromagnetic signal to encode a first data stream; modulating the second polarization component of the second electromagnetic signal to encode a second data stream; and transmitting a combined electromagnetic signal comprising the first and second polarization components of the first electromagnetic signal and the first and second polarization components of the second electromagnetic signal.

It should be noted that the method of the present invention by no means is limited to performing the steps thereof in any particular order. Furthermore, some steps may be performed at one point in time, and other steps at another point in time.

By the "wavelength" of the electromagnetic signals should be understood the carrier wavelength of the electromagnetic signals. Electromagnetic signals that are unmodulated may have substantially a single wavelength, while modulated electromagnetic signals may exhibit a spread in wavelength around the carrier wavelength depending on the modulation method utilized. By the term "carrier wavelength" when used in connection with unmodulated electromagnetic signals, should simply be understood the (single) wavelength of the unmodulated signal.

The first polarization component and the second polarization component are both linearly polarized, and when it is said herein that the second polarization component is orthogonal to the first polarization component, what is meant is that the polarization direction of the linear polarization of the second polarization component is orthogonal to the polarization direction of the linear polarization of the first polarization component.

In this context, it should also be pointed out that the first polarization component of the first electromagnetic signal is orthogonal to the second polarization component of the second electromagnetic signal, and vice versa.

The present invention is based on the realization that a significantly increased data transmission rate can be achieved in a so-called self-homodyne data transmission system basically without requiring a more complex and/or costly data transmission system, by alternating the polarization direction of the modulated signals, such that an unmodulated signal (or a so-called pilot tone that is used as a phase reference in the receiver) is arranged between (in terms of wavelength) two modulated signals.

Since such an unmodulated signal occupies a very small wavelength range as compared to a modulated signal, the modulated signals can be packed tighter (in terms of wavelength) than with existing self-homodyne schemes, such as that shown in FIG. 2b.

Furthermore, through the provision of the unmodulated signal (pilot tone) that is in phase with its corresponding modulated signal (in the orthogonal polarization state), for example I/Q modulation can still be used without any phase or frequency synchronization in the receiver, which means that almost twice the data rate may be possible to achieve without notably increasing the complexity of the receiver.

Put in slightly other words, according to the present invention, data signals are transmitted in both polarizations, but spectrally shifted in relation to each other. For each data signal, a phase reference is transmitted in the same wavelength but in the opposite polarization. In this manner, the phase references are placed in wavelengths where their interference with data signals is minimized. Because sinusoids consume negligible bandwidth compared with data signals, the various aspects of the present invention provide for a higher number of data signals without substantially increasing the receiver complexity.

It should be noted that the steps of dividing the first and second electromagnetic signals into first and second polarization components; and modulating the selected polarization components may take place simultaneously by modulating the signals using polarization selective modulators. That is, the modulators may be configured to receive unpolarized signals and polarize one polarization component while allowing the other polarization component to pass through without being modulated. Such modulators are known to those skilled in the art. In the exemplary case that the electromagnetic signals are optical signals, an optical phase modulator, such as a $LiNbO_3$ optical phase modulator can be used.

Accordingly, the phase alone may be modulated. Alternatively, however, the method according to various embodiments of the invention may advantageously comprise modulating a phase and an amplitude of the first polarization component of the first electromagnetic signal; and modulating a phase and an amplitude of the second polarization component of the second electromagnetic signal. Examples of modulation schemes where the phase and the amplitude are modulated include the well-known modulation schemes QAM (Quadrature Amplitude Modulation) and PSK (Phase Shift Keying).

Furthermore, the various aspects of the present invention are applicable to various types of transmitters, receivers, and data transmission systems, which may use electromagnetic waves in different wavelength regimes for data transmission.

Hence, according to one embodiment, the electromagnetic waves may be light waves for transmission through one or several optical fibers or in free space.

According to another embodiment, the electromagnetic waves may be microwaves or radio waves and may be transmitted wirelessly.

Although the various components of the data transmission systems will typically vary, those skilled in the art in the various fields (such as optical data transmission systems, microwave transmission systems, radio transmission systems etc) will realize which components should be used to achieve the functions required to carry out the various aspects of the present invention.

Moreover, it should be mentioned that various embodiments of the method according to the present invention may advantageously comprise performing the steps of the method for several additional electromagnetic signals having other wavelengths than the above-mentioned first and second wavelengths, in order to encode and transmit additional data streams.

According to a second aspect of the present invention, the above-mentioned and other objects are achieved through a transmitter for transmitting data using polarized electromagnetic waves, comprising: a first signal source being controllable to emit a first electromagnetic signal having a first wavelength, the first electromagnetic signal comprising a first polarization component having a first polarization direction and a second polarization component having a second polarization direction orthogonal to the first polarization direction; a second signal source being controllable to emit a second electromagnetic signal having a second wavelength, the second electromagnetic signal comprising a first polarization component having the first polarization direction and a second polarization component having the second polarization direction orthogonal to the first polarization direction; a first modulator arranged and configured to modulate the first polarization component of the first electromagnetic signal to encode a first data stream; and a second modulator arranged and configured to modulate the second polarization component of the second electromagnetic signal to encode a second data stream.

It should be noted that the transmitter may advantageously comprise several additional signal sources and several additional corresponding modulators.

Furthermore, the transmitter may advantageously, depending on application and/or wavelength range, additionally comprise a polarization combiner arranged and configured to combine the first polarization components of the first electromagnetic signal and the second electromagnetic signal with the second polarization components of the first electromagnetic signal and the second electromagnetic signal to form a combined electromagnetic signal.

Moreover, the transmitter may comprise first and second polarization beam splitters arranged and configured to divide each of the first and second electromagnetic signals into the first polarization component and the second polarization component.

Further effects and features of this second aspect of the present invention are largely analogous to those described above in connection with the first embodiment.

According to a third aspect of the present invention, the above-mentioned and other objects are achieved through a receiver for retrieving a first data stream and a second data stream from a combined electromagnetic signal comprising: a first polarization component, and a second polarization component orthogonal to the first polarization component, the first polarization component comprising a first modulated signal having a first carrier wavelength and a second unmodulated signal having a second carrier wavelength different from the first carrier wavelength, and the second polarization component comprising a first unmodulated signal having the first carrier wavelength and a second modulated signal having the second carrier wavelength, the first data stream being carried by the first modulated signal and the second data stream being carried by the second modulated signal, the receiver comprising: a first receiver branch comprising: a first band pass filter configured to allow passage of the first modulated signal and prevent passage of the second unmodulated signal; a polarization splitter arranged and configured to divide an input electromagnetic signal into the first polarization component, and the second polarization component; a second band pass filter arranged to receive the second polarization component, and configured to output a filtered portion of the second polarization component comprising the first unmodulated signal; and a demodulator arranged to receive the first polarization component comprising the first modulated signal and the filtered portion of the second polarization component comprising the first unmodulated signal and configured to demodulate the first modulated signal using the first unmodulated signal, to thereby retrieve the first data stream; and a second receiver branch comprising: a first band pass filter configured to allow passage of the second modulated signal and prevent passage of the first unmodulated signal; a polarization splitter arranged and configured to divide an input electromagnetic signal into the first polarization component, and the second polarization component; a second band pass filter arranged to receive the first polarization component, and configured to output a filtered portion of the first polarization component comprising the second unmodulated signal; and a demodulator arranged to receive the second polarization component comprising the second modulated signal and the filtered portion of the first polarization component comprising the second unmodulated signal and configured to demodulate the second modulated signal using the second unmodulated signal, to thereby retrieve the second data stream.

It should be noted that the receiver may advantageously comprise several additional receiver branches for retrieving further data streams.

Furthermore, the first band pass filter may be arranged to filter the incoming combined electromagnetic signal directly, or alternatively, be arranged to filter the polarization component with the modulated signal following passage of the combined electromagnetic signal through the polarization splitter.

The purpose of the first band pass filter is to filter out the modulated signal assigned to the particular receiver branch, and the purpose of the second band pass filter is to provide an unmodulated signal (pilot tone) that is as "pure" as possible. Therefore, the second band pass filter may advantageously be configured to allow passage of a narrower wavelength range than the first band pass filter.

According to various embodiments of the receiver according to the present invention, the first receiver branch may further comprise a polarization control device for controlling a polarization state of the electromagnetic signal input to the polarization splitter; and the second receiver branch may further comprise a polarization control device for controlling a polarization state of the electromagnetic signal input to the polarization splitter.

Depending on the medium used for conveying the combined electromagnetic signal from a transmitter to the receiver, the polarization state, such as the polarization direction, of the first and second polarization components may have been altered en route to the receiver. It may therefore, at least for some applications, be advantageous to provide polarization control devices to the receiver branches.

Moreover, the polarization control device of each receiver branch may advantageously comprise a polarization controller and a control unit arranged in a feedback configuration to control the polarization controller based on at least one measured property of at least one of the signals input to the modulator, that is a polarized signal filtered using the first band pass filter and comprising the modulated signal, and a polarized signal filtered using the second band pass filter and comprising the unmodulated signal (pilot tone).

Hereby, the polarization state of the incoming signal can be controlled such that there is substantially no "leakage" (good signal isolation) between the modulated signal in one polarization component and the unmodulated signal in the other (orthogonal) polarization component. This will reduce the bit error rate (BER) of the data transmission. It should be noted that, in communication systems "in the field", it would be practically impossible to try to regulate the polarization based on the BER at the receiver as suggested by U.S. Pat. No. 7,421,210, since this would require knowledge of the exact data stream sent at the receiver. Such information is obviously not available in a real data transmission situation.

According to one embodiment, the control unit of the first receiver branch may be arranged to receive an input signal indicative of a power of the filtered portion of the second polarization component and to control the polarization controller towards a state where the power of the filtered portion of the second polarization component is substantially constant; and the control unit of the second receiver branch may be arranged to receive an input signal indicative of a power of the filtered portion of the first polarization component and to control the polarization controller towards a state where the power of the filtered portion of the first polarization component is substantially constant.

Hereby, the polarization state of the incoming electromagnetic signal can conveniently be optimized without any knowledge of the transmitted data. As a result, a reduced BER can be obtained.

Alternatively, or in combination with the above, the control unit of the first receiver branch may be arranged to receive an input signal indicative of a power of the first polarization component and to control the polarization controller towards a state where the constant term of the power of the first polarization component is minimized; and the control unit of the second receiver branch may be arranged to receive an input signal indicative of a power of the second polarization component and to control the polarization controller towards a state where the constant term of the power of the second polarization component is minimized.

Alternatively, both polarization components may be monitored and the polarization controller may be controlled to minimize the correlation between the polarization components. One method for achieving this is so-called independent component analysis (ICA).

As a further alternative, the polarization controller may be controlled to minimize the power of the modulated frequency component at its carrier frequency. To this end, a portion of the modulated frequency component in each receiver branch may be band pass filtered around its carrier wavelength and the power of the filtered signal may be measured, or FFT may be used.

Moreover, a PLL (phase locked loop) may be used to track the filtered portion of the polarization component comprising the unmodulated signal to be used as a phase reference to improve the quality of the phase reference and thereby reduce the BER. This may be particularly useful in applications where the electromagnetic signals are microwave signals.

Further effects and features of this third aspect of the present invention are largely analogous to those described above in connection with the first and second embodiments.

In addition to the above aspects, the above-mentioned and other objects are achieved through a data transmission system comprising a transmitter according to the second aspect of the present invention and a receiver according to the third aspect of the present invention configured to receive an electromagnetic signal transmitted by the transmitter.

BRIEF DESCRIPTION OF THE DRAWINGS

These and other aspects of the present invention will now be described in more detail, with reference to the appended drawings showing at least one example embodiment of the invention, wherein.

DETAILED DESCRIPTION OF AN EXAMPLE EMBODIMENT OF THE INVENTION

In the present detailed description, various embodiments of the transmitter, receiver, and data transmission system according to the present invention are mainly discussed with reference to a system and system components for data transmission using light that is guided by one or several optical fibers.

It should be noted that this by no means limits the scope of the present invention and that the present invention is equally applicable to data transmission using electromagnetic waves in other wavelength ranges, such as microwaves or radio waves which are transmitted in air and/or suitably designed waveguides.

Those skilled in the art of data transmission systems using other wavelength ranges than those discussed in this detailed description would easily be able to carry out the invention based on the description provided herein, since it would simply be a matter of selecting corresponding components capable of carrying out the corresponding functionality for electromagnetic waves in a different wavelength range.

The present invention relates to a data transmission system where electromagnetic signals with different wavelengths and different polarization states are modulated and transmitted by a transmitter, and received and demodulated by a receiver.

Figure 1:
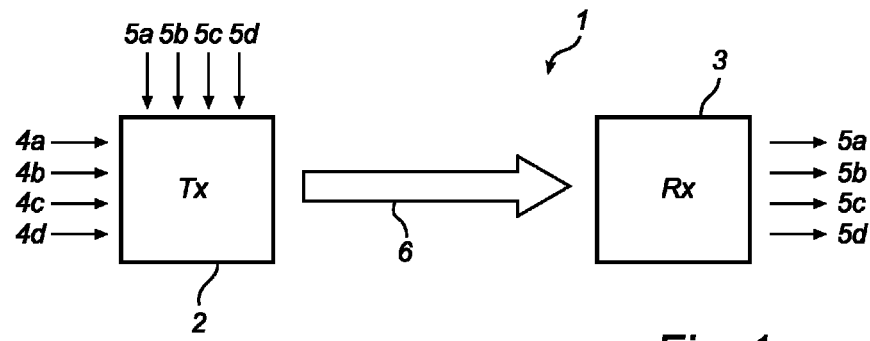
FIG. 1 is a schematic illustration of a data transmission system where electromagnetic signals with different wavelengths and different polarization states are modulated and transmitted by a transmitter, and received and demodulated by a receiver.

FIG. 1 schematically illustrates such a data transmission system 1 comprising a transmitter 2 and a receiver 3. In the schematic data transmission system 1 in FIG. 1, the four electromagnetic signals 4a-d with different wavelengths and four different data streams 5a-d are provided to the transmitter. In the transmitter, each of the electromagnetic signals 4a-d is modulated to encode a corresponding one of the data streams 5a-d. The modulated electromagnetic signals are then propagated towards the receiver 3 as indicated by the propagation path 6 provided between the transmitter 2 and the receiver 3. This propagation path 6 may, for example, be one or several optical fibers or air. In the receiver 3, the modulated electromagnetic signals are demodulated to retrieve the data streams 5a-d, which may then be passed on from the receiver 3 as is indicated by the arrows in FIG. 1.

In a data transmission system 1 such as that schematically shown in FIG. 1, various data transmission schemes may be utilized. Two such known data transmission schemes using polarization division multiplexing (PDM) are schematically shown in FIGS. 2a-b.

Figure 2A:
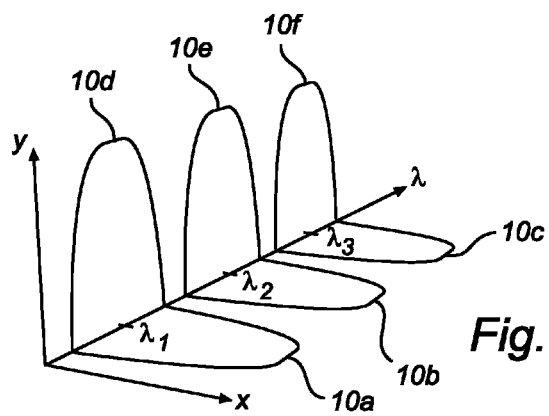
FIGS. 2a-b schematically illustrates two different data transmission schemes according to prior art.
Figure 2B:
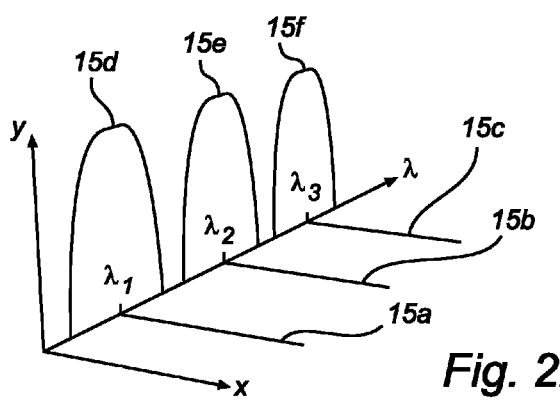

According to the scheme of FIG. 2a, six different modulated electromagnetic signals 10a-f are transmitted using three different wavelengths $\lambda_1$, $\lambda_2$, and $\lambda_3$. Three of the signals 10a-c are linearly polarized in the polarization plane represented by the x-axis, and three of the signals 10d-f are linearly polarized in the polarization plane represented by the y-axis.

According to this scheme, data can be packed densely, but, as was discussed in the Background section, at the cost of a complex and costly receiver.

In the data transmission scheme of FIG. 2b, again six electromagnetic signals 15a-f are transmitted using three different wavelengths $\lambda_1$, $\lambda_2$, and $\lambda_3$. Three of the signals 15a-c are linearly polarized in the polarization plane represented by the x-axis, and three of the signals 15d-f are linearly polarized in the polarization plane represented by the y-axis. However, the transmission scheme of FIG. 2b differs from that of FIG. 2a in that the signals 15d-f in the polarization plane represented by the y-axis are unmodulated signals that can be used as phase references in the receiver. Hereby, the receiver can be simpler than for the data transmission scheme in FIG. 2a, and it is easier to use more advanced modulation formats.

The above description of transmission schemes according to the prior art are provided for comparison with what is obtainable using various aspects of the methods and devices according to the present invention. The following description will be related to exemplary embodiments of the present invention, starting with a description of a transmitter according to an embodiment of the present invention, which will be described with reference to FIG. 3.

Figure 3:
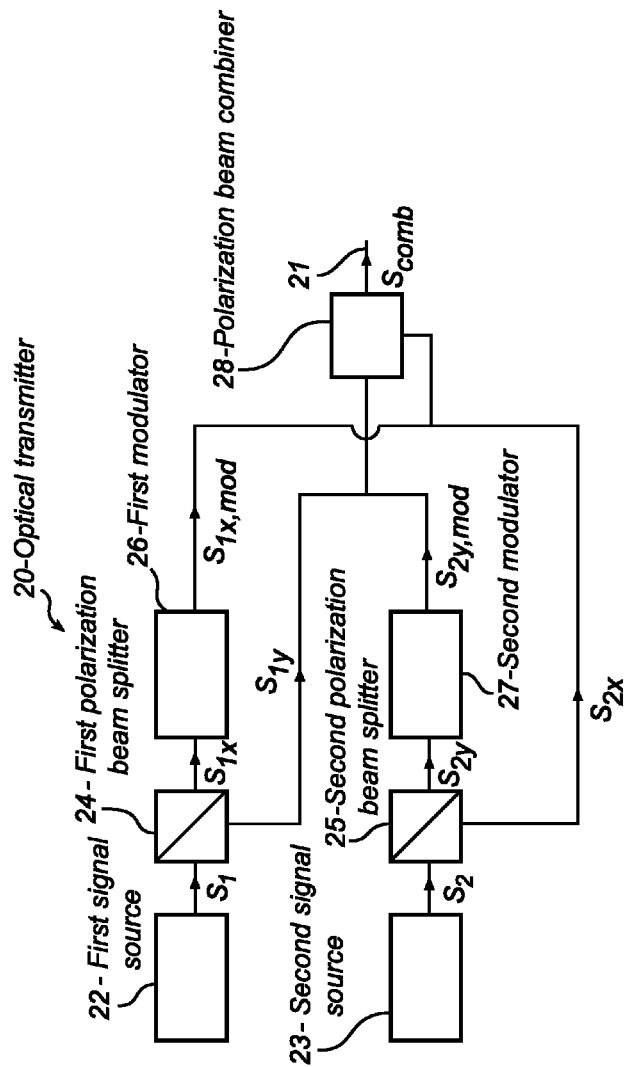
FIG. 3 schematically illustrates a transmitter according to an embodiment of the present invention.

FIG. 3 schematically shows an optical transmitter 20 for transmitting data using modulated optical signals through an optical fiber 21. The optical transmitter in FIG. 3 comprises a first signal source in the form of a first laser 22 controllable to emit a first signal $S_1$ having a first wavelength $\lambda$ and a second signal source in the form of a second laser 23 controllable to emit a second signal $S_2$ having a second wavelength $\lambda_2$. The optical transmitter 20 further comprises first 24 and second 25 polarization beam splitters which are arranged to receive light output by the first 22 and second 23 lasers, respectively, and configured to divide the light output by the lasers 22, 23 into first polarization components indicated by the letter 'x' in FIG. 3 and second polarization components indicated by the letter 'y' in FIG. 3. The optical transmitter 20 further comprises first 26 and second 27 modulator, which may for example be so-called I/Q-modulators, arranged and configured to modulate selected polarization components of the first and second signals as indicated in FIG. 3, and a polarization beam combiner (PBC) 28 arranged to combine the polarization components of the first $S_1$ and second $S_2$ electromagnetic signals.

To preserve the polarization state of the first and second polarization components of the electromagnetic signals $S_1$, $S_2$, the different components of the transmitter 20 in FIG. 3 may advantageously be interconnected using so-called polarization maintaining fibers (PMF).

It should be noted that FIG. 3 is a schematic illustration of a simplified transmitter 20 in order not to obscure the invention in detail which is, per se, well-known to those skilled in the art. For example, the transmitter may naturally comprise many additional signal sources being controllable to emit electromagnetic signals having other wavelengths.

Figure 4:
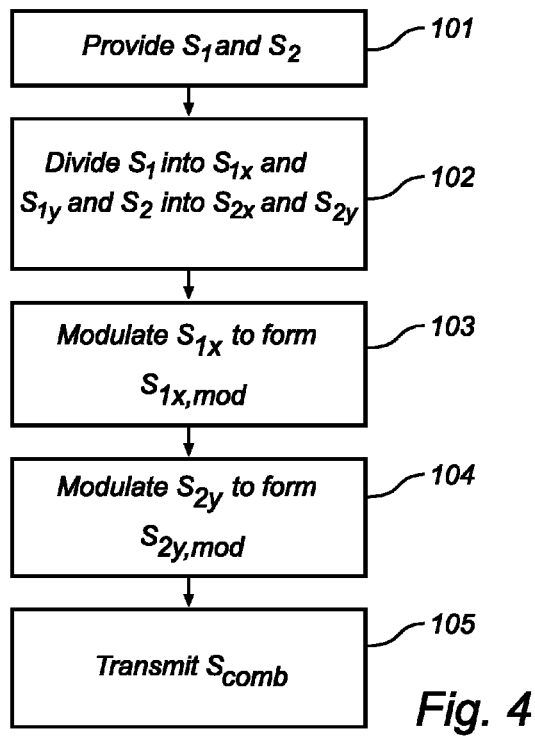
FIG. 4 is a flow chart schematically illustrating an embodiment of the method according to the present invention.

The function of the transmitter 20 in FIG. 3 will now be discussed further with reference to FIG. 4, which is a flow chart schematically illustrating an embodiment of the method according to the present invention.

In a first step 101, a first electromagnetic signal $S_1$ having a first wavelength $\lambda_1$ and a second electromagnetic signal $S_2$ having a second wavelength $\lambda_2$ are provided using the first 22 and second 23 signal sources in FIG. 3.

Subsequently, in step 102, each of the first $S_1$ and second $S_2$ electromagnetic signals is divided into a first polarization component $S_{1x}$, $S_{2x}$ having a first polarization direction (indicated by the subscript 'x') and a second polarization component $S_{1y}$, $S_{2y}$ having a second polarization component (indicated by the subscript 'y'). The first polarization direction and the second polarization direction are orthogonal to each other, similar to what was described above in connection to the prior art data transmission schemes of FIGS. 2a-b.

In step 103, which may be carried out simultaneously with the above-mentioned step 102 and by the same components or be carried out subsequently using other components as is schematically illustrated in FIG. 3, the first polarization component $S_{1x}$ of the first electromagnetic signal $S_1$ is modulated to encode a first data stream using the modulated polarized signal $S_{1x,mod}$.

In step 104, which may be carried out in parallel with step 103, and which, like step 103, may be carried out simultaneously with the above-mentioned step 102, the second polarization component $S_{2y}$ of the second electromagnetic signal $S_2$ is modulated to encode a second data stream using the modulated polarized signal $S_{2y,mod}$.

For the modulation, various modulators known to those skilled in the art can be used. For instance, I/Q-modulators may be used.

Finally, in step 105, a combined electromagnetic signal $S_{comb}$ comprising the first $S_{1x}$, and second $S_{1y}$, polarization components of the first electromagnetic signal $S_1$ and the first $S_{2x}$, and second $S_{2y}$, polarization components of the second electromagnetic signal $S_2$ is transmitted. The combined signal $S_{comb}$ that is transmitted will be different from the signal output when any of the previously described data transmission schemes (FIGS. 2a-b) are used. Specifically, data can be packed practically as densely (in terms of wavelength) as is obtainable using the data transmission scheme of FIG. 2a, while providing phase reference signals for allowing easier demodulation at the receiver as in the data transmission scheme of FIG. 2b.

Figure 5:
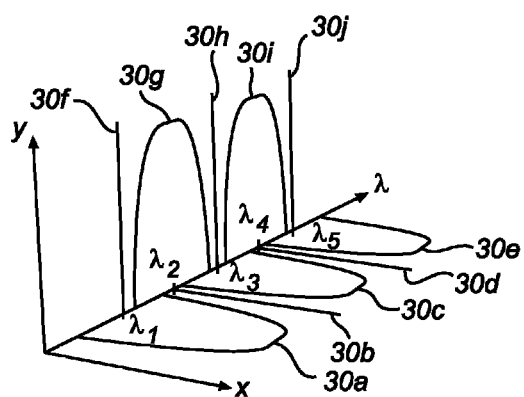
FIG. 5 schematically illustrates an output from the transmitter of the type in FIG. 3.

This will now be described with reference to FIG. 5, which schematically illustrates the combined electromagnetic signal $S_{comb}$ transmitted by the kind of transmitter shown in FIG. 3, with the difference that the diagram in FIG. 5 illustrates data transmission using five different wavelengths $\lambda_1$-$\lambda_5$, while the simplified transmitter 20 shown in FIG. 3 provides two different wavelengths $\lambda_1$ and $\lambda_2$.

In the data transmission scheme achievable through various embodiments of the present invention, which is schematically illustrated in FIG. 5, ten electromagnetic signals 30a-j are transmitted using five different wavelengths $\lambda_1$-$\lambda_5$. Five of the signals 30a-e are linearly polarized in the polarization plane represented by the x-axis, and five of the signals 30f-j are linearly polarized in the polarization plane represented by the y-axis.

As can be seen in FIG. 5, the differently polarized signals are alternately modulated, so that every other signal in the x-plane 30a,c,e is modulated and the remaining signals in the x-plane 30b,d are unmodulated. In the same way, every other signal in the y-plane 30g,i are modulated and the remaining signals in the y-plane 30f,h,j are unmodulated.

Since the unmodulated signals occupy very little wavelength space, two adjacent modulated signals can be arranged very close to each other in terms of wavelength. And as there is an unmodulated signal in one polarization plane that originates from the same signal source as a corresponding modulated signal in the other polarization plane, the unmodulated signals can be used as phase references in the receiver in the same way as was briefly discussed above for the data transmission scheme of FIG. 2b.

Finally, a receiver 40 according to an embodiment of the present invention will be described with reference to FIG. 6.

Figure 6:
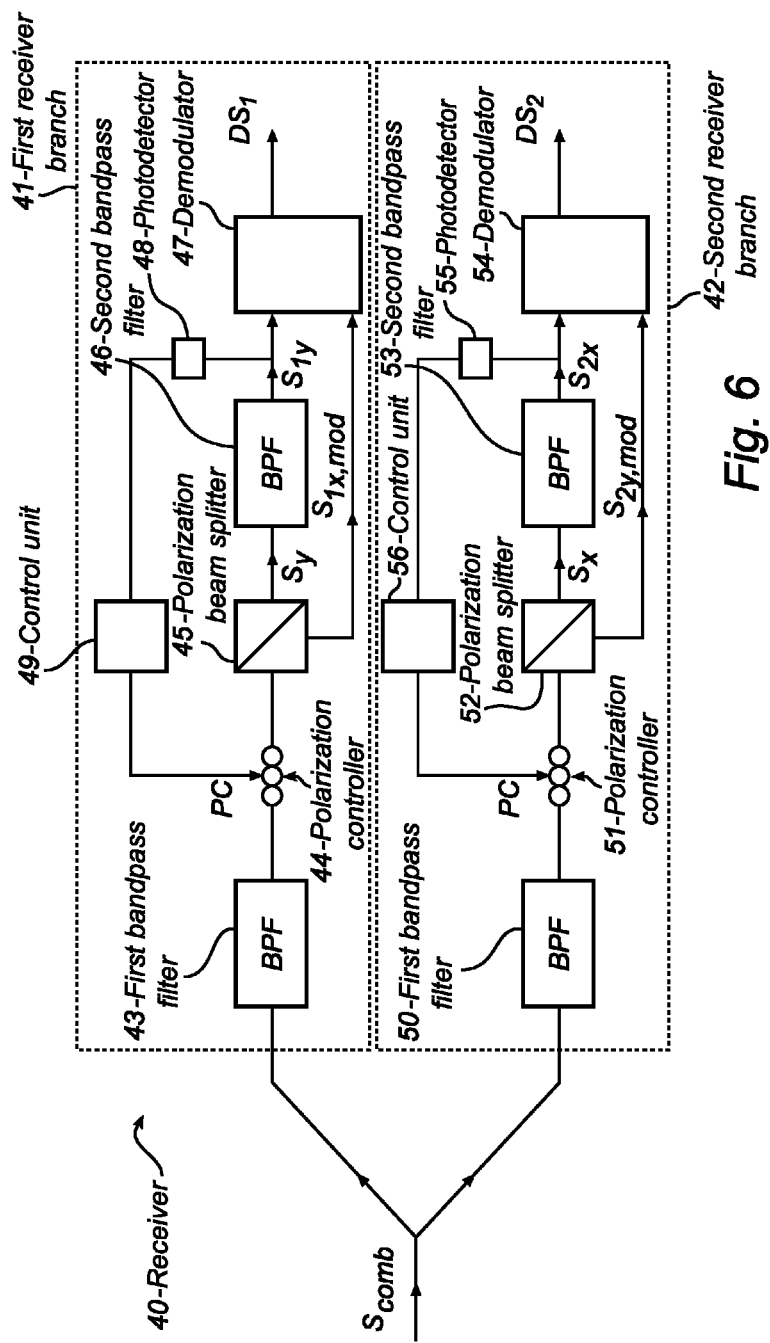
FIG. 6 schematically illustrates a receiver according to an embodiment of the present invention.

The receiver 40 of FIG. 6 is an example of an optical receiver for receiving and demodulating modulated optical signals transmitted using, for example, a transmitter 20 such as that described above with reference to FIG. 3. It should again be mentioned that the invention by no means is limited to transmitting data using optical signals, but that electromagnetic signals in other wavelength ranges may advantageously be used and that those skilled in the art for data communication using such electromagnetic signals would have no trouble adapting what is disclosed herein for optical signals to their particular wavelength ranges.

Returning to FIG. 6, the receiver 40 comprises a first receiver branch 41 and a second receiver branch 42. The first receiver branch 41 comprises a first bandpass filter (BPF) 43, a polarization controller 44, a polarization beam splitter (PBS) 45, a second bandpass filter (BPF) 46, and a demodulator 47. The first receiver branch 41 further comprises a feedback circuit comprising a photodetector 48 and a control unit 49 arranged to control the polarization controller 44 based on the output of the photodetector 48.

Similarly, the second receiver branch 42 comprises a first bandpass filter (BPF) 50, a polarization controller 51, a polarization beam splitter (PBS) 52, a second bandpass filter (BPF) 53, and a demodulator 54. The second receiver branch 42 further comprises a feedback circuit comprising a photodetector 55 and a control unit 56 arranged to control the polarization controller 51 based on the output of the photodetector 55.

The function of the receiver will now be described with reference to the first receiver branch 41. The second receiver branch 42 is largely identical to the first receiver branch 41, the difference being that the polarization components are treated differently as is indicated in FIG. 6 using the same notation as was used in FIG. 3.

The first BPF 43 filters the combined optical signal $S_{comb}$ to only allow passage of a wavelength range including the modulated polarization component of the first signal $S_{1x,mod}$ (corresponding to 30a in FIG. 5) and excluding the unmodulated polarization component of the second signal $S_{ex}$ (corresponding to 30b in FIG. 5). Thereafter the signal filtered by the first BPF 43 passes through the polarization controller 44, where the polarization state of the signal is controlled to provide for sufficient polarization separation between the modulated polarization component of the first signal $S_{1x,mod}$ and the unmodulated polarization component of the first signal $S_{1y}$. The polarization controller 44 is controlled using a feedback circuit, as will be described in more detail further below.

After having passed through the polarization controller 44, the signal is divided into a first polarization component which essentially corresponds to the modulated polarization component of the first signal $S_{1x,mod}$ and a second polarization component $S_y$ including the unmodulated signal $S_{1y}$, as well as parts of the neighboring modulated signal(s) (in this case parts of the neighboring signal 30g in FIG. 5). To isolate the unmodulated signal $S_{1y}$, the second polarization component is passed through a second BPF 46 which defines a narrower wavelength range than the first BPF 43. Thereafter, as is schematically illustrated in FIG. 6, the modulated polarization component of the first signal $S_{1x,mod}$ and the unmodulated polarization component of the first signal $S_{1y}$ are input to the demodulator 47, where the first data stream $DS_1$ is retrieved.

To keep the bit error rate (BER) of the transmitted data stream down, it has been found to be advantageous to control the polarization state of the signal before the PBS 45 using the polarization controller 44 based on at least one property of at least one of the output signals of the PBS 45. In the example illustrated in FIG. 6, a fraction of the filtered portion of the second polarization component is diverted and allowed to hit the photodetector 48. If the light that hits the photodetector 48 is unmodulated, the output from the photodetector 48 will be a DC-signal, but if (a portion of) the modulated signal in the first polarization component $S_x$ has "leaked into" the second polarization component $S_y$, the output from the photodetector 48 will have an AC-component. By regulating the polarization controller 44 such that the AC-component is minimized, improved separation between the polarization components can be achieved, which in turn results in a reduced BER of the data stream $DS_1$. Alternatively, or in combination, a photodetector can be provided which diverts light from the first polarization component (which should be modulated) and controls the polarization controller 44 such that the DC-component of the output from that photodetector is minimized.

As mentioned above, the function of the second receiver branch 42 is the same as for the first receiver branch 41, except that the wavelength range of the first BPF 50 is different to only allow passage of a wavelength range including the modulated polarization component of the second signal $S_{2x,mod}$ (corresponding to 30g in FIG. 5) and excluding the unmodulated polarization component of the first and third signals (corresponding to 30f and 30h in FIG. 5). Furthermore, the first polarization component $S_x$ is passed through the second BPF to isolate the unmodulated signal $S_{2x}$ to be used as the phase reference in the demodulator 54, while the modulated polarization component of the second signal $S_{2y,mod}$ is passed directly to the demodulator 54, where the second data stream $DS_2$ is retrieved.

Additionally, variations to the disclosed embodiments can be understood and effected by the skilled person in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The invention claimed is:

1. A data transmission system comprising:
a transmitter (20) for transmitting data using polarized electromagnetic waves, comprising:
a first signal source (22) being controllable to emit a first electromagnetic signal ($S_1$) having a first wavelength ($\lambda_1$), said first electromagnetic signal ($S_1$) comprising a first polarization component ($S_{1x}$) having a first polarization direction and a second polarization component ($S_{1y}$) having a second polarization direction orthogonal to the first polarization direction;
a second signal source (23) being controllable to emit a second electromagnetic signal ($S_2$) having a second wavelength ($\lambda_2$), said second electromagnetic signal ($S_2$) comprising a first polarization component ($S_{2x}$) having said first polarization direction and a second polarization component ($S_{2y}$) having said second polarization direction orthogonal to the first polarization direction;
a first modulator (26) arranged and configured to modulate the first polarization component ($S_{1x}$) of said first electromagnetic signal ($S_1$) to encode a first data stream ($DS_1$); and
a second modulator (27) arranged and configured to modulate the second polarization component ($S_{2y}$) of said second electromagnetic signal ($S_2$) to encode a second data stream ($DS_2$):and
a receiver (40) for retrieving a first data stream ($DS_1$) and a second data stream ($DS_2$) from a combined electromagnetic signal ($S_{comb}$) comprising:
a first polarization component ($S_x$), and a second polarization component ($S_y$) orthogonal to said first polarization component,
said first polarization component ($S_x$) comprising a first modulated signal ($S_{1x,mod}$) having a first carrier wavelength ($\lambda_1$) and a second unmodulated signal ($S_{2x}$) having a second carrier wavelength ($\lambda_2$) different from the first carrier wavelength, and said second polarization component ($S_y$) comprising a first unmodulated signal ($S_{1y}$) having said first carrier wavelength ($\lambda_1$) and a second modulated signal ($S_{2y,mod}$) having said second carrier wavelength ($\lambda_2$),
said first data stream ($DS_1$) being carried by said first modulated signal ($S_{1x,mod}$) and said second data stream ($DS_2$) being carried by said second modulated signal ($S_{2y,mod}$),
the receiver (40) comprising:
a first receiver branch (41) comprising:
a first band pass filter (43) configured to allow passage of said first modulated signal ($S_{1x,mod}$) and prevent passage of said second unmodulated signal ($S_{2x}$);
a polarization splitter (45) arranged and configured to divide an input electromagnetic signal into said first polarization component ($S_x$) and said second polarization component ($S_y$);
a second band pass filter (46) arranged to receive said second polarization component ($S_y$), and configured to output a filtered portion of said second polarization component comprising said first unmodulated signal ($S_{1y}$); and
a demodulator (47) arranged to receive said first polarization component ($S_x$) comprising said first modulated signal ($S_{1x,mod}$), and said filtered portion of the second polarization component comprising said first unmodulated signal ($S_{1y}$) and configured to demodulate said first modulated signal using said first unmodulated signal, to thereby retrieve said first data stream ($DS_1$):
and a second receiver branch (42) comprising:
a first band pass filter (50) configured to allow passage of said second modulated signal ($S_{2y,mod}$) and prevent passage of said first unmodulated signal ($S_{1y}$);
a polarization splitter (52) arranged and configured to divide an input electromagnetic signal into said first polarization component ($S_x$) and said second polarization component ($S_y$);
a second band pass filter (53) arranged to receive said first polarization component ($S_x$), and configured to output a filtered portion of said first polarization component comprising said second unmodulated signal ($S_{2x}$); and
a demodulator (54) arranged to receive said second polarization component comprising said second modulated signal ($S_{2y,mod}$) and said filtered portion of the first polarization component comprising said second unmodulated signal ($S_{2x}$) and configured to demodulate said second modulated signal using said second unmodulated signal, to thereby retrieve said second data stream ($DS_2$);

the receiver (40) configured to receive an electromagnetic signal transmitted by said transmitter.

2. The data system according to claim 1, wherein the transmitter (20) further comprises a polarization combiner (28) arranged and configured to combine the first polarization components ($S_{1x}$; $S_{2x}$) of the first electromagnetic signal ($S_1$) and the second electromagnetic signal ($S_2$) with the second polarization components ($S_{1y}$; $S_{2y}$) of the first electromagnetic signal ($S_1$) and the second electromagnetic signal ($S_2$) to form a combined electromagnetic signal ($S_{comb}$).

3. The data system according to claim 1, wherein said first modulator (26) is configured to modulate at least a phase of the first polarization component of said first electromagnetic signal, and said second modulator (27) is configured to modulate at least a phase of the second polarization component of said second electromagnetic signal.

4. The data system according to claim 3, wherein said first modulator (26) is configured to modulate a phase and an amplitude of the first polarization component of said first electromagnetic signal, and said second modulator (27) is configured to modulate a phase and an amplitude of the second polarization component of said second electromagnetic signal.

5. The data system according to claim 1, wherein each of said first signal source (22) and said second signal source (23) is a laser.

6. A receiver (40) for retrieving a first data stream ($DS_1$) and a second data stream ($DS_2$) from a combined electromagnetic signal ($S_{comb}$) comprising:

a first polarization component ($S_x$), and a second polarization component ($S_y$) orthogonal to said first polarization component, said first polarization component ($S_x$) comprising a first modulated signal ($S_{1x,mod}$) having a first carrier wavelength ($\lambda_1$) and a second unmodulated signal ($S_{2x}$) having a second carrier wavelength ($\lambda_2$) different from the first carrier wavelength, and said second polarization component ($S_y$) comprising a first unmodulated signal ($S_{1y}$) having said first carrier wavelength ($\lambda_1$) and a second modulated signal ($S_{2y,mod}$) having said second carrier wavelength ($\lambda_2$), said first data stream ($DS_1$) being carried by said first modulated signal ($S_{1x,mod}$) and said second data stream ($DS_2$) being carried by said second modulated signal ($S_{2y,mod}$), the receiver (40) comprising:

a first receiver branch (41) comprising:

a first band pass filter (43) configured to allow passage of said first modulated signal ($S_{1x,mod}$) and prevent passage of said second unmodulated signal ($S_{2x}$);

a polarization splitter (45) arranged and configured to divide an input electromagnetic signal into said first polarization component ($S_x$) and said second polarization component ($S_y$);

a second band pass filter (46) arranged to receive said second polarization component ($S_y$), and configured to output a filtered portion of said second polarization component comprising said first unmodulated signal ($S_{1y}$); and a demodulator (47) arranged to receive said first polarization component ($S_x$) comprising said first modulated signal ($S_{1x,mod}$) and said filtered portion of the second polarization component comprising said first unmodulated signal ($S_{1y}$) and configured to demodulate said first modulated signal using said first unmodulated signal, to thereby retrieve said first data stream ($DS_1$);

and a second receiver branch (42) comprising:

a first band pass filter (50) configured to allow passage of said second modulated signal ($S_{2y,mod}$) and prevent passage of said first unmodulated signal ($S_{1y}$);

a polarization splitter (52) arranged and configured to divide an input electromagnetic signal into said first polarization component ($S_x$) and said second polarization component ($S_y$);

a second band pass filter (53) arranged to receive said first polarization component ($S_x$), and configured to output a filtered portion of said first polarization component comprising said second unmodulated signal ($S_{2x}$); and a demodulator (54) arranged to receive said second polarization component comprising said second modulated signal ($S_{2y,mod}$) and said filtered portion of the first polarization component comprising said second unmodulated signal ($S_{2x}$) and configured to demodulate said second modulated signal using said second unmodulated signal, to thereby retrieve said second data stream ($DS_2$).

7. The receiver (40) according to claim 6, wherein:

said first receiver branch (41) further comprises a polarization control device for controlling a polarization state of said electromagnetic signal input to said polarization splitter (45); and said second receiver branch (42) further comprises a polarization control device for controlling a polarization state of said electromagnetic signal input to said polarization splitter (52).

8. The receiver (40) according to claim 7, wherein said polarization control device of the first receiver branch (41) comprises:

a polarization controller (44)polarization controller arranged to output a polarization-controlled electromagnetic signal to said polarization splitter (45) and a control unit (49) arranged in a feedback configuration to control said polarization controller (44) based on at least one measured property of at least one of said first polarization component and said filtered portion of the second polarization component; and wherein said polarization control device of the second receiver branch (42) comprises:

a polarization controller (51) arranged to output a polarization-controlled electromagnetic signal to said polarization splitter (52); and a control unit (56) arranged in a feedback configuration to control said polarization controller (51) based on at least one measured property of at least one of said second polarization component and said filtered portion of the first polarization component.

9. The receiver (40) according to claim 8, wherein the control unit (49) of said first receiver branch (41) is arranged to receive an input signal indicative of a power of said filtered portion of the second polarization component and to control said polarization controller (44) towards a state where the power of said filtered portion of the second polarization component is substantially constant; and wherein the control unit (56) of said second receiver branch (42) is arranged to receive an input signal indicative of a power of said filtered portion of the first polarization component and to control said polarization controller

(51) towards a state where the power of said filtered portion of the first polarization component is substantially constant.

* * * * *